United States Patent [19]
Kaufman et al.

[11] Patent Number: 5,102,710
[45] Date of Patent: Apr. 7, 1992

[54] COMPOSITE DECORATE PANEL

[75] Inventors: Dennis E. Kaufman, Westerville; Michael G. Robinson, Columbus, both of Ohio

[73] Assignee: Vacuform Industries, Inc., Columbus, Ohio

[21] Appl. No.: 566,505

[22] Filed: Aug. 13, 1990

[51] Int. Cl.[5] .......................... B32B 3/00; B32B 3/08; B32B 5/18
[52] U.S. Cl. ........................................ 428/71; 428/76; 428/319.1; 428/319.9; 52/309.9; 52/309.12
[58] Field of Search ............ 428/71, 76, 319.1, 319.9; 52/309.8, 309.9, 309.12

[56] References Cited

U.S. PATENT DOCUMENTS 4,463,043  7/1984  Reeves et al. ..................... 428/71

Primary Examiner—Alexander S. Thomas
Attorney, Agent, or Firm—Michael L. Keller

[57] ABSTRACT

A composite decorative laminated panel for use in the construction industry which provides both superior design aesthetics and functional characteristics. The composite panel is a sandwich construction with an outer shell of thermoplastic material coated with a weatherable polymer, a rigid foam interior and a fire retardant backerboard.

8 Claims, 7 Drawing Sheets

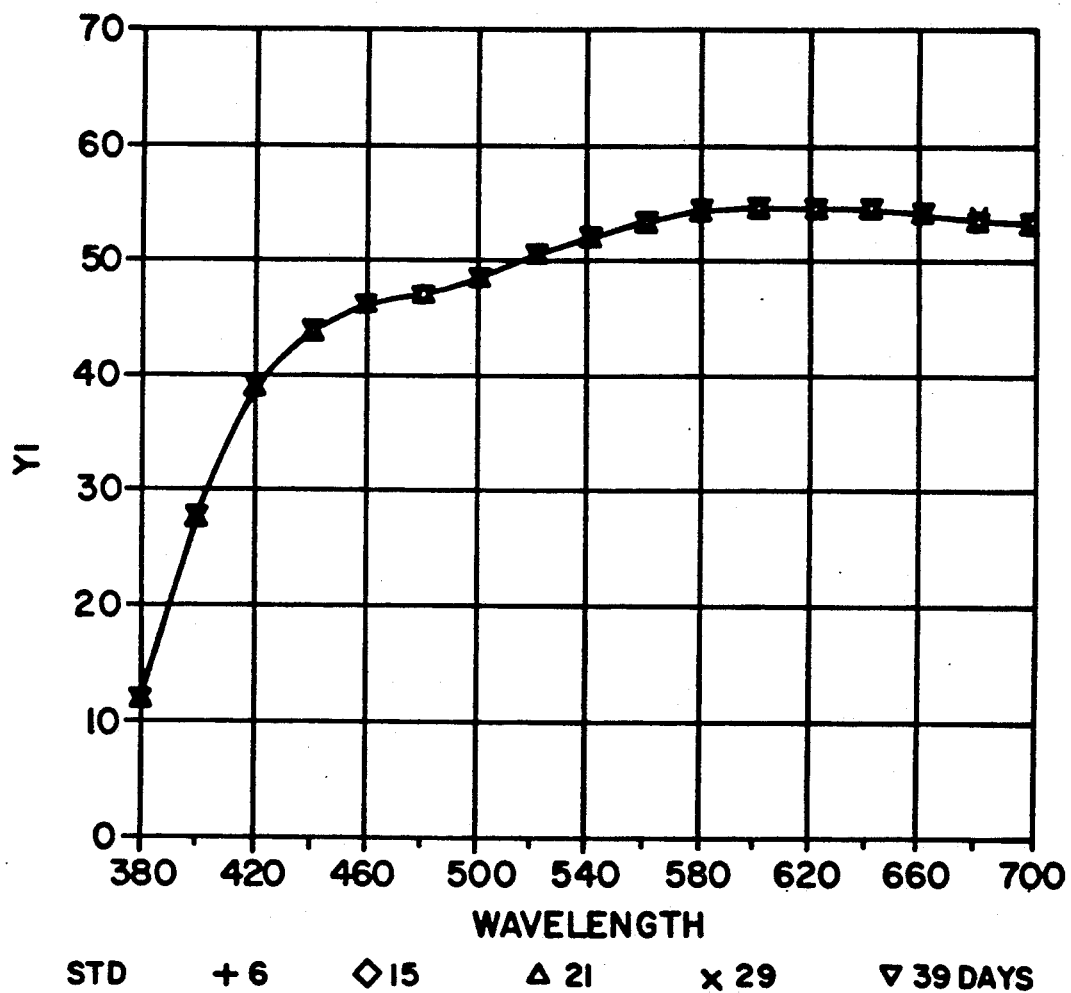

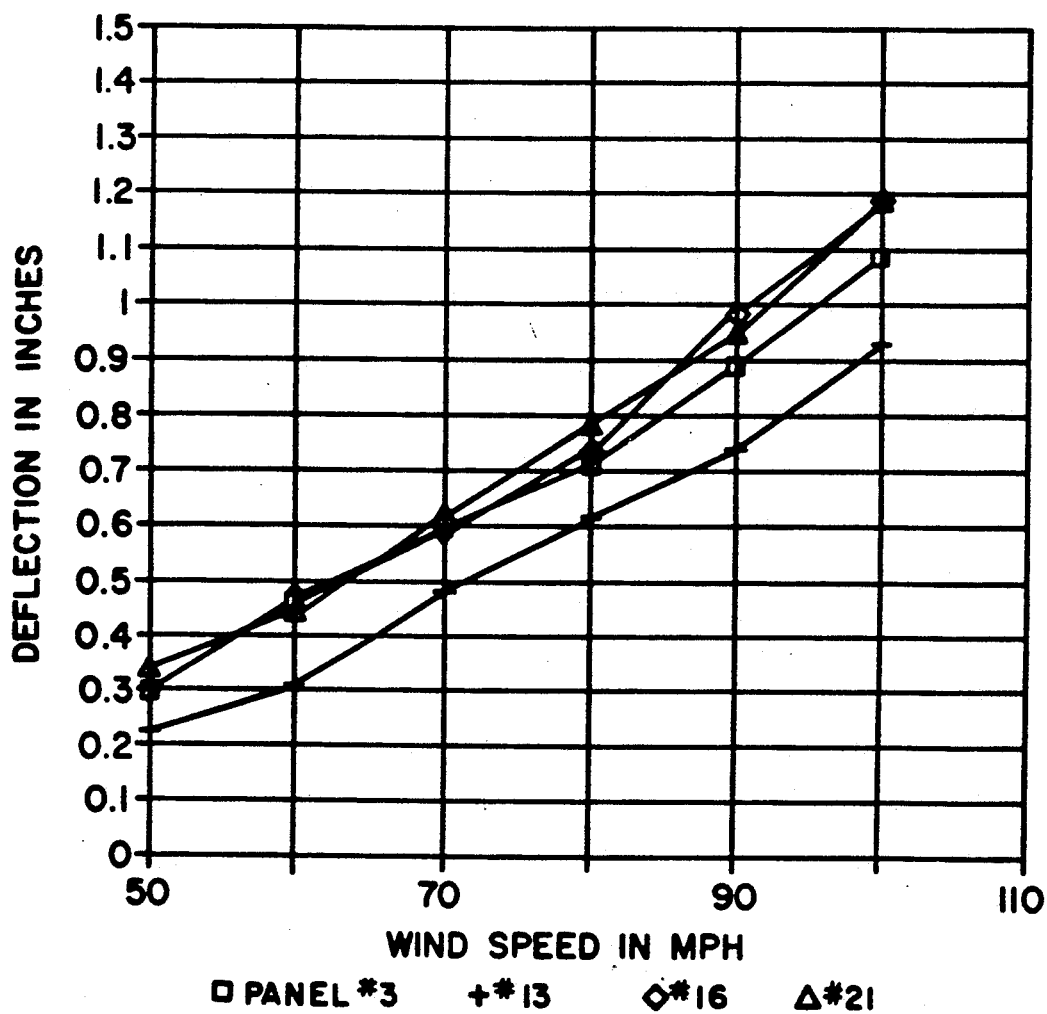

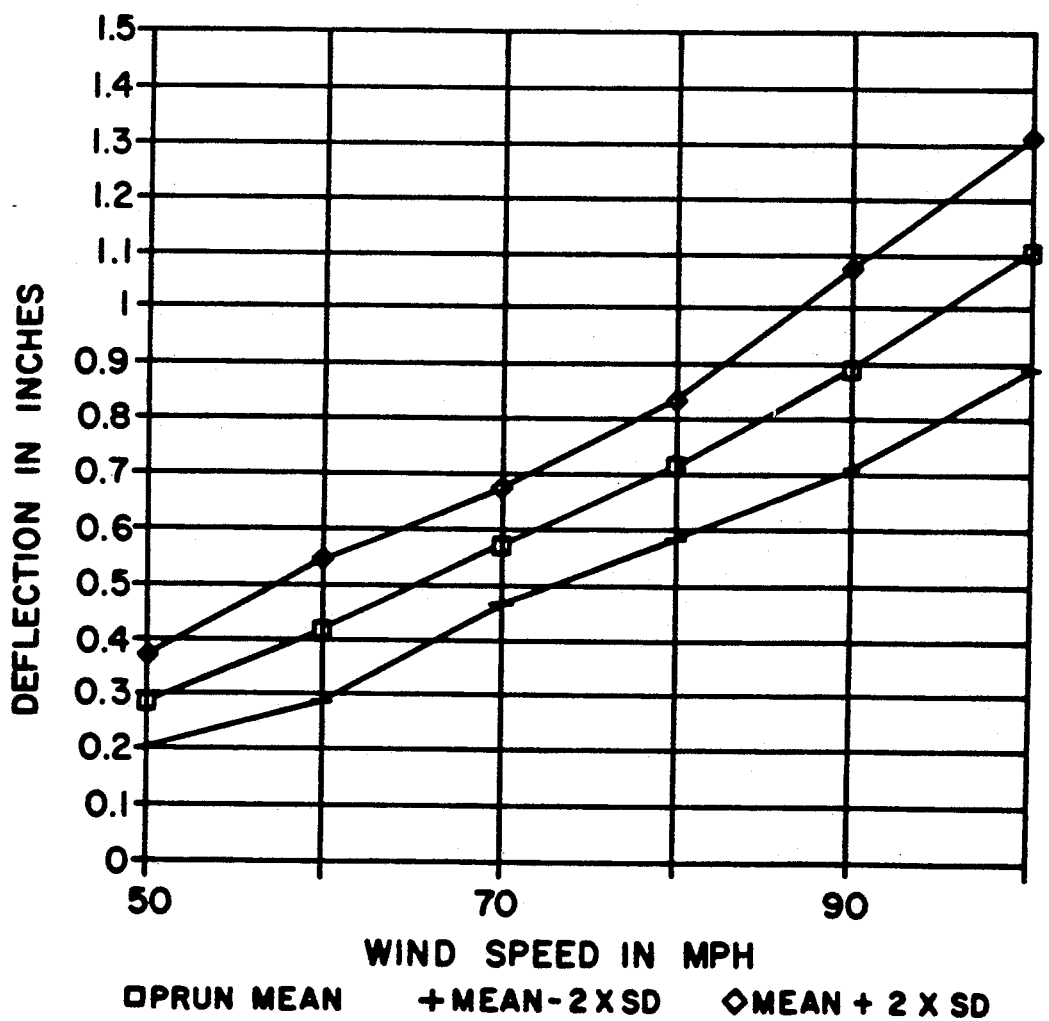

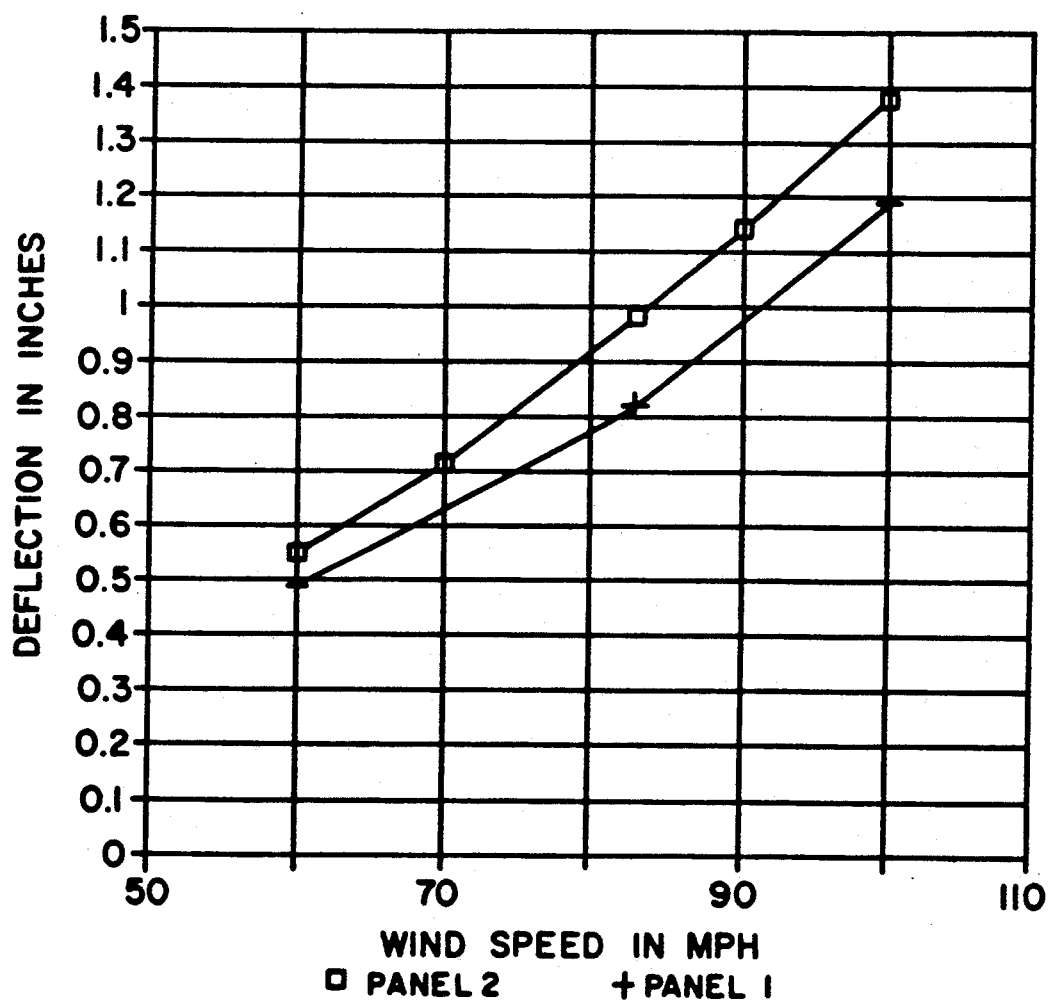

WEATHEROMETER TESTING YELLOWNESS INDEX

— INDEX MEASUREMENTS

COLOR SHIFT BY WAVELENGTH WEATHERED vs. NON-WEATHERED

TIME LINES
— NON-WEATHERED   —+— WEATHERED 1000 HRS.

COMPOSITE DECORATE PANEL

BACKGROUND AND SUMMARY OF THE INVENTION

The present invention relates to a composite laminated decorative panel for use in building wall systems, decorative trim roof fascia systems, chiller and equipment screens, rooftop structures requiring an EM window or louver panel, and the like. The decorative panel of the present invention is a three component sandwich pane comprised of a formed thermoplastic shell with a weatherable skin, a rigid foam center and a fire blocking backerboard.

Panel roof systems of formed ABS or acrylic with weatherable coating have been in service for over a decade. While these systems have performed well in service, they have not been the solution to a number of problems facing the building industry. The composite decorative panel of the present invention has been developed to solve these problems and has many advantages over the products currently in service. The decorative panel has also been designed for a number of different applications.

The products presently in service as architectural panels include fiberglass, fiberglass reinforced cememts, and Kynar-coated aluminum. All of these products have their disadvantages; and accordingly, it is an object of the present invention to provide a decorative panel with improved weather resistance and strength which can be produced in varied shapes, textures and styles.

It is also an object of the present invention to provide a decorative panel which has these characteristics and is light weight and easy to handle and install. The panel must also be easily produced at competitive costs.

Another object is to provide a composite decorative panel which also has excellent UV resistance and color retention, provides insulating R value to conserve energy and provides a fire break backer and flame resistance.

Still another object of the present invention is to make the composite panel from commercially available components and which can be manufactured with a highly automated process with reliable repeatability.

Sweets' 1989 Catalog File No. 7 for Thermal & Moisture Protection, Section 07420 Composite Building Panels illustrates a number of panels currently in use. These include glass fiber reinforced concrete panels, porcelain on aluminum architectural building panels, precast polymer concrete building panels, acrylic polymer wall finishes, fiberglass insulation board and related products.

Other panel structures are disclosed in U.S. Pat. Nos. 4,663,210, 4,239,796, 3,640,796, 3,637,459, 3,668,031, 3,895,085, 4,227,356, 4,268,574, and 4,743,485.

The laminated decorative panel of the present invention has an outer shell of thermoplastic material which is coated with a weatherable coating. The shell is filled with a rigid foam and is backed with fire blocking backerboard. The thermoplastic shell is normally constructed of ABS, but other materials such as PC-PVC polycarbonate-polyvinyl chloride, or polystyrene can be used depending on the nature of the service. Suitability weatherable coatings include weatherable polymers sold by DOW Chemical Company under its registered trademark ROVEL®; and Fluorex, a polyvinydiene fluoride film made by Rexham. ROVEL® brand weatherable polymers are high impact styrene-acrylonitrile polymers that are impact modified with a saturated olefinic elastomer.

The process for making the composite decorate panel is efficient and designed for flexibility. The ABS panel is first capped with the weatherable coating forming a laminated panel. The laminated panel is then molded into the desired shape and foamed in place. The fire blocking backerboard is installed, and the composite panel is pressed until the foam has cured. The panel is removed from the press and trimmed to the desired dimensions.

DESCRIPTION OF THE DRAWINGS

FIG. 2 is a graph illustrating the results of a weathermeter test.

FIGS. 3, 4 and 5 are graphs illustrating the results of wind load tests.

DETAILED DESCRIPTION OF THE INVENTION

The composite laminated decorative panel of the present invention is a three component sandwich panel comprised of a thermoplastic shell which is laminated with a weatherable coating. There is a rigid foam center and a fire blocking backerboard. The thermoplastic material will vary depending on the ultimate service of the panel; however, ABS (a mixture of styrene acrylonitrile copolymer (SAN) with SAN-grafted polybutadiene rubber) is preferred. Other materials that can be used are PC-PVC or polystyrene for low temperature service. The thickness of the thermoplastic material will range from $\frac{1}{8}$" to 3/16", and is preferably $\frac{1}{8}$".

Figure 1:
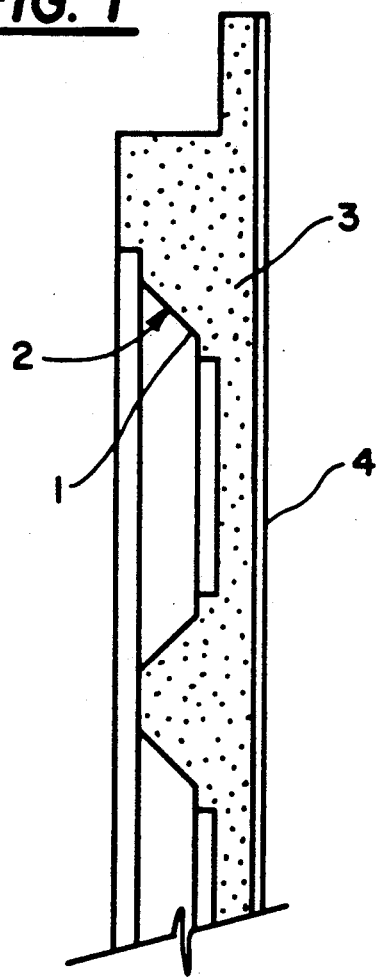
FIG. 1 is a cross-section of a typical composite laminated decorative panel of the present invention.

The thermoplastic shell, FIG. 1, 2, is coated or laminated with a weatherable coating or laminate 1. Again, the section of the coating will depend on the final service of the panel; but, weatherable polymers sold by Dow Chemical Company under its registered trademark ROVEL®, have very desirable characteristics. Other acceptable coatings include CENTREX® brand weatherable high gloss, high impact, sheet extrusion resin sold by Monsanto Plastics, (CENTREX® is a registered trademark of Monsanto Company) and KORAD® acrylic film made KORAD Incorporated. The preferred coating is Fluorex, a poyvinyldiene fluoride (PVDF) film made by Rexham. PVDF is a high molecular weight polymer of vinyldiene fluoride with the predominant repeating unit of $-CH_2CF_2-$. It is a crystalline material with a melting point of 338° F. and a density of 1.78 g/cc. The Flourex cap is applied to the ABS shell just as the ABS solidifies in order to form a homogeneous bond.

The laminated shell is heated to a forming temperature and placed on a mold. The vacuum is pulled and the laminated panel is formed into its desired shape. Decorative texturizing can be imparted to she during the forming process.

The shaped laminated shell is filled with a UL Class I rated foam. Preferably, the foam is a polyurethane rigid foam ranging from 3.2 PCF to 0.5 PCF free-rise density. The density is based on the required R factor.

The foam is prepared in a foam pour-in-place machine. The foam is poured into the shaped laminated shell at the desired density and level. The foam serves several purposes. First, it adds strength and stability to the panel. Strength is important for shipping, handling and installation, while stability is important for control of expansion and contraction so that the panel remains flat during service. The foam also makes the panel energy efficient and adds insulation (R factor) to the wall system where it is employed. Finally, the foam is the bonding agent to the backerboard.

After the foam is poured into the shaped shell, the backerboard 4 is installed by bonding to the foam 3. The backerboard is preferably a non-combustible fiber reinforced cement panel. The preferred fire blocking backerboard is ETERBOARD ® brand non-asbestos composite building panels made by Eternit, Inc. ETERBOARD ® brand backerboard is a medium high density calcium silicate panel compound of Portland cement, mineral filler and natural fibers. ETERBOARD ® is a registered trademark of Eternit. The backerboard is preferably ¼" to ½" thick and is water resistant as well as fire retardant.

After the backerboard has been installed, the composite panel is pressed to cure the foam 3. After curing, the composite panel is removed from the press and trimmed to the desired dimensions. The composite panel is then ready for packing and shipment.

FIG. 2 is a graph of results for a weatherometer test conducted by an independent laboratory on a ABS/-Fluorex laminated panel of the present invention. As shown in TABLE I below, the yellowness index reading changed by less than 0.5 after 1000 hours of exposure.

TABLE I

| Hours | Index |
|---|---|
| 0 | 17.98 |
| 500 | 17.93 |
| 750 | 18.18 |
| 1000 | 18.12 |

FIGS. 3-5 illustrate the results of wind load testing on a number of laminated panels of the present invention. The results are also set forth in TABLE II below:

TABLE II

| | DEFLECTION UNDER WIND LOAD IN INCHES | | | | | | | |
|---|---|---|---|---|---|---|---|---|
| WIND SPEED | PRODUCTION PANEL # | | | | STATISTICAL DATA | | | |
| MPH | #3 | #13 | #16 | #21 | MEAN | STD | −2 SD | +2 SD |
| 50 | 0.3 | 0.227 | 0.305 | 0.34 | 0.293 | 0.041 | 0.211 | 0.375 |
| 60 | 0.455 | 0.307 | 0.466 | 0.446 | 0.419 | 0.065 | 0.289 | 0.548 |
| 70 | 0.6 | 0.482 | 0.59 | 0.614 | 0.572 | 0.052 | 0.467 | 0.676 |
| 80 | 0.715 | 0.612 | 0.733 | 0.784 | 0.711 | 0.063 | 0.586 | 0.836 |
| 90 | 0.89 | 0.739 | 0.978 | 0.948 | 0.889 | 0.092 | 0.705 | 1.073 |
| 100 | 1.09 | 0.93 | 1.184 | 1.19 | 1.099 | 0.105 | 0.888 | 1.09 |

Four panels, i.e., Nos. 3, 13, 16 and 21, were randomly pulled from a run of 35 panels of the furnished product. These four panels were taken to an independent testing lab and set up in a standard frame. The wind test was conducted starting at 50MPH and increased in steps of 10 MPH until a top wind speed of 100 MPH was reached.

TABLE II shows the deflection of each panel and also shows the mean and standard deviation. When the wind load was removed, the panels returned to flat.

FIG. 5 shows the deflection testing of two panels from a different production run and of a different size from panels 3, 13, 16 and 21. The test conditions were the same.

Two panels of the present invention were subjected to deep thermal cycling. Each panel spent 4-5 weeks in an environmental chamber. The results of this testing are set forth in TABLE III below:

TABLE III

| Panel #2 | 4 weeks-8 cycles<br>384 hrs. at −29 F.<br>288 hrs. at +125 F. |
|---|---|
| Results: | No change, no cracking, crazing or delamination. |
| Panel #4 | 5 weeks-11 cycles<br>378 hrs. at −29 F.<br>462 hrs. at +125 F. |
| Results: | No change, no cracking, crazing or delamination. |

The following TABLES IV and V set forth the test results of edgewise compressive and tensile strength, respectively. The tests of TABLE IV were conducted in accordance with ASTM C364-Edgewise Compressive Strength of Flat Sandwich Construction (1988) and the tests of TABLE V were conducted in accordance with ASTM C297-Tensile Strength of Flat Sandwich Constructions in Flatwise Plane (1988).

TABLE IV

| | COMPRESSION TEST RESULTS | | | | | | |
|---|---|---|---|---|---|---|---|
| Sample No. | Length (in.) | Width (in.) | Average Thickness (in.) | Elastic Load (lbs.) | Elastic Stress (psi) | Ultimate Load (lbs.) | Ultimate Stress (psi) |
| 1 | 4.05 | 3.80 | 2.69 | 4150 | 406 | 4700 | 724 |
| 2 | 4.02 | 3.90 | 2.71 | 3950 | 374 | 5350 | 809 |
| 3 | 3.95 | 3.91 | 2.71 | **** | *** | 5400 | 816 |
| 4 | 4.01 | 3.93 | 2.63 | 3750 | 363 | 5050 | 770 |
| 5 | 4.02 | 3.90 | 2.73 | 4100 | 385 | 5300 | 799 |
| Average | | | | | 382 | | 784 |

**** not evident

TABLE V

TENSILE TEST RESULTS

| Sample No. | Length (in.) | Width (in.) | Average Thickness (in.) | Ultimate Load (lbs.) | Ultimate Stress (psi) |
|---|---|---|---|---|---|
| 1 | 3.96 | 3.93 | .61 | 670 | 43 |
| 2 | 4.09 | 4.03 | 2.54 | 770 | 47 |
| 3 | 4.00 | 3.98 | 2.69 | 880 | 55 |
| 4 | 3.92 | 3.98 | 2.61 | 350 | 22 |
| 5 | 4.03 | 4.01 | 2.64 | 680 | 42 |
| Average | | | | | 42 |

The compression specimens all experienced the same failure mode. The specimens deflected linearly to the elastic limit, at which point the backing began to crush and delaminate. The specimen then carried additional load until the ultimate load was reached. A separation of the ABS face and the foam was evident in a few localized regions. The average compressive strength at the proportional limit was 382 psi. The average ultimate compressive strength was 784 psi.

All of the tensile specimens experienced a planar separation perpendicular to the applied load. Three of the five items failed at the interface of the foam and the backing board. One specimen (#2) failed through the center of the backing board, while another (#3) failed through the middle of the foam core material. The average tensile (ultimate) strength of the five samples was 42 psi.

The results of the tensile tests are somewhat questionable in that the samples were of irregular thickness. This made it impossible for both surfaces of the specimens, when mounted, to be oriented perpendicular to the applied load. When not perpendicular, the resulting stress concentrations create a peeling effect and cause the specimens to fail prematurely. For this reason, the results shown by specimen #3, which failed through the foam, are probably the most representative of the true strength of the sandwich material.

TABLE VI below shows the results of tests conducted in accordance with ASTM E84 fame spread tunnel tests. The composite panel of the present invention were tested under ASTM E84-89a, "Standard Method of Test for Surface Burning Characteristics of Building Materials". The purpose of the test was to evaluate performance of the panels in relation to that of glass reinforced cement load and red oak flooring under similar fire exposure. The results are expressed in terms of flame spread, smoke developed and temperature during a ten minute exposure and are recorded as a ratio with glass-reinforced cement board at zero and read oak flooring at one hundred. To allow for possible variations in results due to limitations of the test method, the numerical results were adjusted to the nearest figure divisible by fire.

TABLE VI

| | | |
|---|---|---|
| Construction: | Sandwich panel consisting of fluorex-caped ABS, Class I polyurethane foam with eater board back | |
| Width: | 20.75 in. | (0.527 m) |
| Length: | 96.00 in. | (2.438 m) |
| Total Thickness: | 2.5 in. | (63.500 mm) |
| Total Weight: | 152.4 lb. | (69.190 kg) |
| PREPARATION AND CONDITIONING | | |
| Substrate Used: | 0.25 in. (6.35 mm) glass-reinforced cement board placed between the specimen and the furnace lid | |
| Date In Lab: | 05/22/90 | |
| Conditioning: | 1 day, 70° F. and 50% relative humidity | |
| Preparation: | The 21 in. × 25 ft. (0.53 × 7.63 m) specimen was prepared using the panels submitted by the Client. These were placed end-to-end in the furnace with the Eater board back side exposed to the flames. No other support or preparation was required. A 14 × 21 in. (0.36 × 0.53 m) section of 16-ga (1.6 mm) sheet metal was placed over the burner and under the leading edge of the first section to deter flame impingement on the unexposed surface in accordance with the test procedure. | |
| TEST RESULTS | | |
| Test Date: | 05/23/90 | |
| Test Time: | 09:25:46 | |
| Flame Spread Index: | 10 | |
| Smoke Developed Index: | 185 | |
| OBSERVATIONS DURING TEST | | |
| Color Change, min:s | 0:48 | |
| Steady Ignition, min:s | 5.38 | |
| Cracks, min:s | 1.17 | |
| Pieces Falling, min:s | 6.23 | |
| Maximum Flame Front, min:s | 9:45 | |
| Position | 11.0 ft. | (3.35 m) |
| Afterflame Top, min:s | 3:00+ | |
| Other: | Eater board broke through during test, thus exposing approximately 6.0 ft. of the foam core to the flames | |
| OBSERVATIONS AFTER TEST | | |
| Surface Char To | 15.0 ft. | (4.575 m) |
| Severe Char To | 10.0 ft. | (3.050 m) |
| Small Cracks To | 18.0 ft. | (5.490 m) |
| Large Cracks To | 6.00 ft. | (1.830 m) |

Figure 6A:
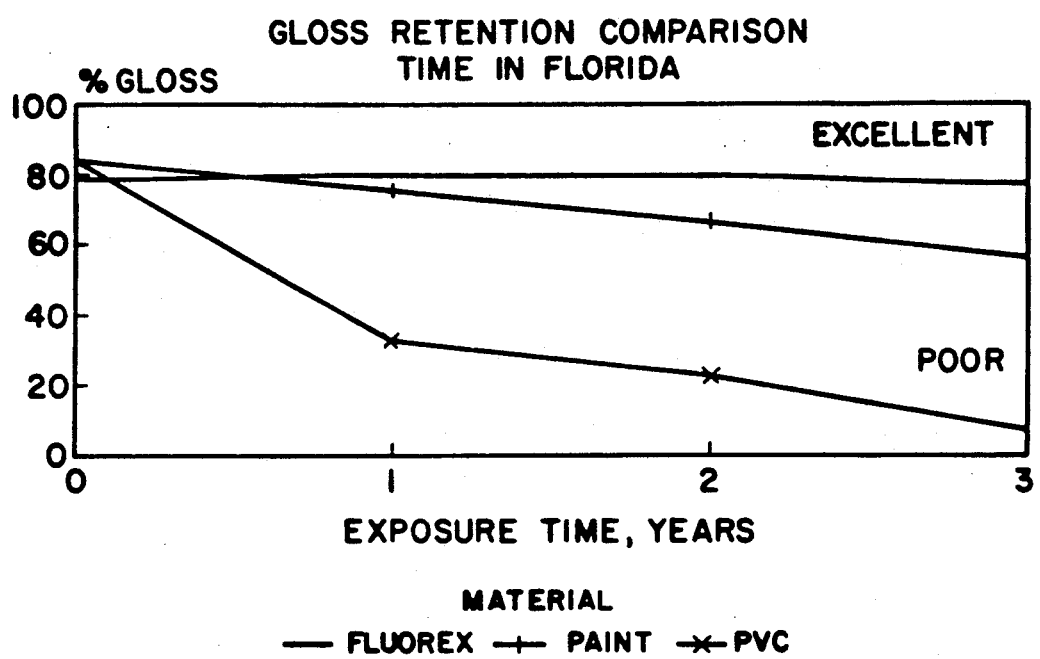
FIGS. 6A, 6B, 6C, 6D are a series of graphs illustrating the results of Fluorex weather testing.
Figure 6B:
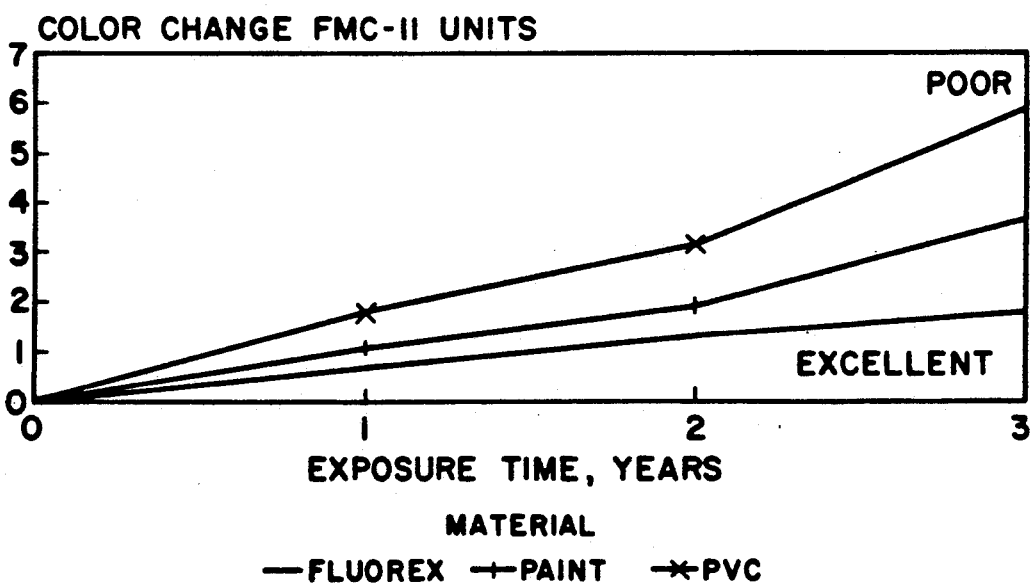
Figure 6C:
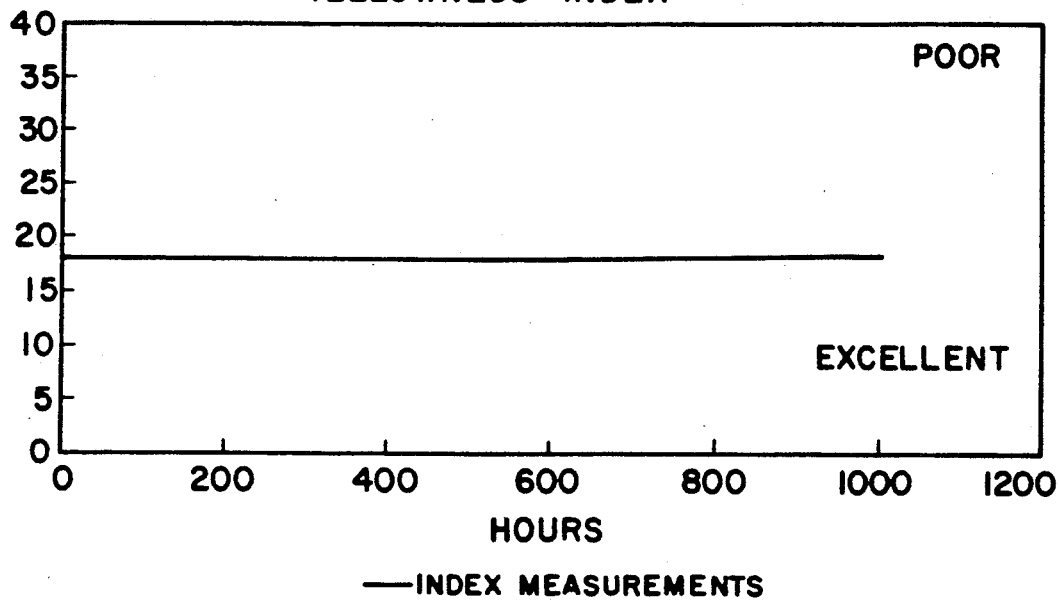
Figure 6D:
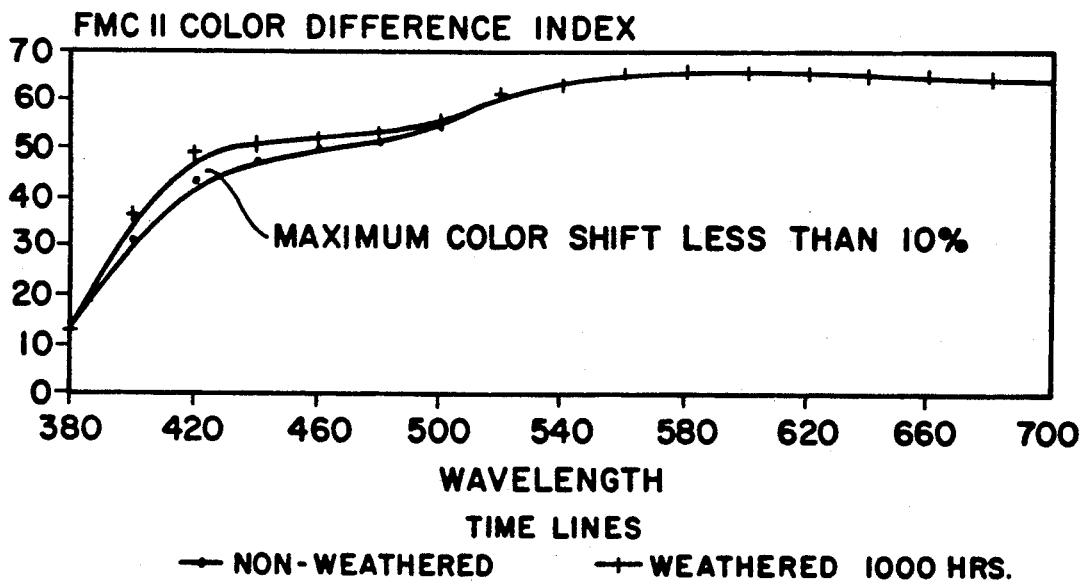

FIGS. 6A, 6B, 6C and 6D are a series of graphs illustrating the results of weathering tests conducted on a musky white color Fluorex. FIG. 6A shows the results of a Gloss Retention Comparison. FIG. 6B shows the results of a Color Retention Comparison. FIG. 6C shows the results of a weatherometer test. FIG. 6D shows the results of a Color Shift by Wavelength Comparison of Weathered versus Non-Weathered.

As is illustrated in FIGS. 2, 3, 4, 5, 6A, 6B, 6C and 6D and in TABLES I-VI, the composite laminated panel of the present invention has superior functional characteristics. In addition, the composite laminated panel of the present invention offers many design advantages. Panels can be made up to four feet wide by nine feet long in a wide variety of geometric shapes, surface finishes, textures and colors. In addition, the panel provides an insulating R factor to conserve energy and is fire retardant.

The composite panel can also be constructed with structural reinforcing which will increase the cross section modules of the panel. The reinforcing increases the strength of the panel and provides additional stability. Materials which can be incorporated for structural reinforcing include aluminum, steel, fiber glass, acrylic egg crating, and polycarbonate honeycomb.

What is claimed is:

1. A composite decorative panel comprising,
    (a) an outer shell of thermoplastic material, said outer shell having an outer surface;
    (b) said outer surface of said outer shell coated with a weatherable coating;

(c) a rigid foam interior having a surface not covered by said outer shell; and (d) a fire retardant backerboard bonded to said rigid foam interior surface not covered by said outer shell.

2. The composite panel of claim 1 wherein said outer shell is ABS.

3. The composite panel of claim 1 wherein said outer shell is polystyrene.

4. The composite panel of claim 1 wherein said weatherable coating is a polymer.

5. The composite panel of claim 1 wherein said weatherable coating is a polyvinyldiene fluoride film.

6. The composite panel of claim 1 wherein said rigid foam is polyurethane.

7. The composite panel of claim 1 wherein said backerboard is a fiber reinforced cement panel.

8. The composite decorative panel comprising, (a) an outer shell of ABS, said outer shell having an outer surface;

(b) said outer surface of said outer shell is laminated with a polyvinyldiene fluoride film;

(c) a rigid polyurethane foam interior having a surface not covered by said outer shell; and (d) a fire retardant fiber reinforced cement panel bonded to said surface of said rigid foam interior not covered by said outer shell thereby forming the back of said composite panel.

* * * * *